United States Patent

Kitai

[15] 3,699,866
[45] Oct. 24, 1972

[54] CAMERA SHUTTER OPERATING MECHANISM

[72] Inventor: Kiyoshi Kitai, Tokyo, Japan

[73] Assignee: Kabushiki Kaisha Hattori Tokeiten, Tokyo, Japan

[22] Filed: July 23, 1971

[21] Appl. No.: 165,085

[30] Foreign Application Priority Data

July 23, 1970 Japan..................45/63964

[52] U.S. Cl. ..................95/63, 95/10 C, 95/53 E
[51] Int. Cl. ...........................G03b 9/14
[58] Field of Search ..................95/63, 53 E

[56] References Cited

UNITED STATES PATENTS

| | | | |
|---|---|---|---|
| 3,526,183 | 9/1970 | Hartl | 95/63 |
| 3,448,672 | 6/1969 | Singer | 95/63 |

Primary Examiner—Samuel S. Matthews
Assistant Examiner—Richard L. Moses
Attorney—Robert E. Burns et al.

[57] ABSTRACT

A camera shutter operating mechanism in which a shutter blade-operating ring is rotationally driven in opposite directions for opening and closing the shutter by three coupled driving members in which the direction of rotation of the driving members is such that their rotational forces are all additive in one direction in operating the shutter blade-operating ring in two opposite directions. The first and second driving members are time-delayed coupled to execute rotation in one direction and the third driving member is positively coupled to the second driving member and is held from rotating by an exposure delay or exposure time control circuit controlling the exposure time of a photographic exposure. Upon release of the third driving members by the exposure time control circuit the rotation of the three driving members is as though they were rotating in a common direction. Division of the driving force between two springs reduces impact forces upon coupling of the driving members. The movement of these driving members in effectively the same direction of rotation likewise reduces impact forces and vibration.

3 Claims, 5 Drawing Figures

PATENTED OCT 24 1972 3,699,866

3,699,866

CAMERA SHUTTER OPERATING MECHANISM

BACKGROUND OF THE INVENTION

The present invention relates generally to cameras and more particularly to a new and improved camera shutter-operating mechanism.

DESCRIPTION OF PRIOR ART

In camera shutter constructions including electronically operated shutters shutter-operating members of such mechanisms driven in a common or single direction generate a large impact shock when one of the driven members engages another for driving it in a common direction. The shock is particularly large when the driving members driven in a common direction are rotationally coupled to effect closing of the shutter after the exposure time period has passed. These mechanisms accordingly necessarily require that the electromagnet in the time delay circuit controlling the exposure time have a relatively large increase in attractive capacity because of the shocks encountered in the rotating members. Moreover, the members themselves must have an increased mechanical strength so that the net result is necessary enlarging of the electric shutter mechanism.

SUMMARY OF THE INVENTION

It is a principal object of the present invention to provide a shutter-operating mechanism eliminating the above mentioned defects of this type of shutter and to provide a shutter in which the control of the closing member by an electromagnet is stable and accurate.

In the shutter-operating mechanism according to the invention a shutter blade-operating ring for operating the shutter blades of the shutter from a closed position is actuated by three driving members. These members constitute a first pivotally mounted shutter-ring driving member which is rotationally biased by a spring and engages the shutter ring and drives it in a shutter opening direction to an open position when it is released by a release member. A second pivotally mounted shutter-ring driving member is coupled to the first driving member during rotation thereof and rotates in the same direction with it. This second driving member has a forked portion in which is receives a pin on a third pivotally mounted shutter-ring driving member that is positively coupled to the third driving member. The third driving member is releasably held by an electromagnet controlled by an exposure time delay circuit. When it is released to close the shutter the third driving member rotates with the second driving member and the first member coupled thereto and any impact from the rotating members one upon the other as they engage each other is eliminated. As the third driving member rotates it engages a pin on the shutter blade-operating ring and drives it in an opposite direction for closing the shutter blades.

BRIEF DESCRIPTION OF THE DRAWINGS

Other objects and advantages of the shutter operating mechanism in accordance with the present invention will appear from the following description of an example of the invention and the novel features particularly pointed out in the appended claims and in the drawings.

DESCRIPTION OF THE PREFERRED EMBODIMENTS

The shutter operating mechanism according to the invention comprises a shutter ring 1, illustrated fragmentarily, rotatably mounted on a shutter housing which opens shutter blades pivotally mounted on a base plate, not shown, by a connection thereto usually constructed as a slot and pin arrangement in which rotation of the ring 1 in a clockwise direction opens the blades and rotation in an opposite or counterclockwise direction closes the shutter-blades subsequent to the determination of an exposure delay time. The ring 1 is provided with a change-over pin 2 cooperating with a change-over switch S as hereinafter described, and a shutter-opening pin 3 engaged by the shutter-operating mechanism as hereinafter described for rotating the ring 1 in a clockwise direction to open the shutter blades and a third shutter-closing pin 4 on a side thereof and engaged by the mechanism for rotating the shutter in an opposite direction for closing the shutter blades.

Figure 1:
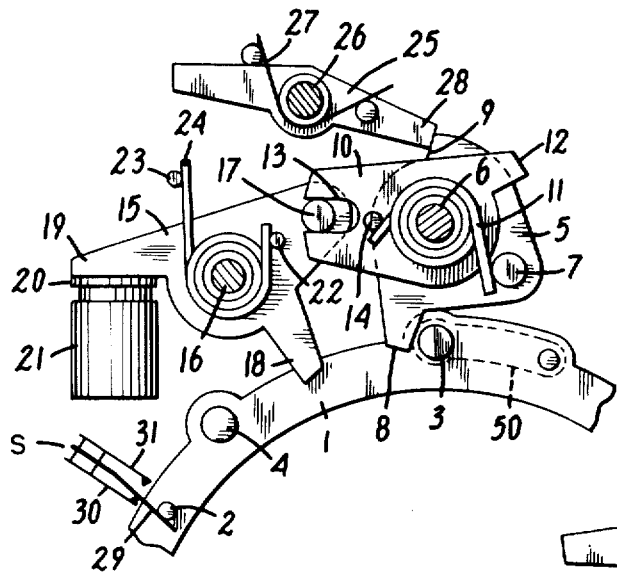
FIG. 1 is a side elevation diagrammatic view of a shutter operating mechanism in accordance with the invention illustrating the mechanism in a cocked condition.

The shutter operating mechanism for rotatably driving the shutter ring comprises a first shutter-ring driving member 5 pivotally mounter on a pivot 6 having a stop or coupling pin 7 for coupling the first shutter-ring driving member to the remainder of the mechanism as hereinafter disclosed. A projection 8 on the first driving member cooperates with the shutter-opening pin 3 on the shutter ring for opening the shutter blades as the first driving member is rotationally driven. A stop projection 9 is provided on the first member for releasably holding the first driving member in readiness for taking an exposure when the shutter and its shutter-operating mechanism are in a cocked condition as illustrated in FIG. 1.

A second shutter-ring driving member 10 is pivotally mounted coaxial with the first driving member on its pivot 6. A spring 11 biases the first driving member rotationally in a counterclockwise direction so that when an exposure is taken and the first driving member is released from its cocked position it is rotationally driven by the spring 11 and its coupling pin 7 engages a projection 12 on the second driving member so that it drives the second driving member rotationally subsequently to the initiation of its own rotation. The spring 11 effecting the rotation likewise couples the first and second driving members and is disposed with one end bearing on the first driving member stop and coupling pin 7 and a second pin 14 on the second driving member. The second driving member is provided with a forked portion with a slot 13 for coupling to a third driving member 15 pivotally mounted on a pivot 16. The third driving member has a pin 17 engaged in the notch or slot in the forked portion of the second member for positive coupling therebetween.

The third driving member rotates in a clockwise direction and is provided with a projection 18 extending outwardly from the body thereof so that it can engage the shutter-closing pin 4 on the shutter ring for rotation of the ring in the direction for closing the shutter. A second arm or projection 19 on the third shutter-operating or driving member supports a magnetically attractable armature 20 attracted by an electromagnet 21 to the position illustrated in FIG. 1 in readiness for release of third driving member upon determination of the delay time or exposure time by control circuits hereinafter described. The third driving member is biased in a clockwise direction by a biasing or driving spring 24 engaging a stop pin 22 on the third driving member and a fixed pin 23 on the base plate, note shown of the shutter.

The shutter-operating mechanism is selectively released by a shutter-release member 25 pivotally mounted on a pivot 26 biased in a clockwise direction by a spring 27 and having an end 28 engaging a stop surface 9 on the first driving member so that the shutter-operating mechanism is releasably held in locked condition when the shutter is in a cocked condition.

Figure 4:
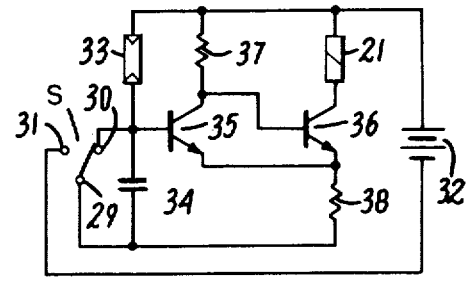
FIG. 4 is a circuit diagram of a delay circuit for controlling exposure time for taking of photographic exposures.

A control circuit illustrated in FIG. 4 is provided for controlling the exposure time for taking photographic exposures with the exposure time automatically controlled as a function of the brightness of the field being photographed. The change-over switch S is illustrated as comprising a movable contact 29 held against a stationary contact 30 by the shutter ring change-over pin 2 when the shutter is in a cocked condition and the movable contact 29 is biased by its spring construction to engage a stationary contact 31 when the shutter ring 1 is operated in a clockwise direction as hereinafter described.

The exposure time control circuit is provided with a source of power 32 to which is connected a photoconductive device 33 in series with a capacitor 34. A junction between the series photoconductive device and the capacitor and the change-over switch S is connected to a base of a first stage transistor 35 connected to a second stage transistor 36 in a Schmit trigger circuit configuration. The collector of the first stage transistor 35 is connected through a resistor 37 to the battery and to the base of the second stage transistor 36 which has the operating coil of the electromagnet 21 connected to its collector circuit and the battery as shown. Both transistors have their emitters connected through a resistor 38 to the change-over switch movable contact 29.

Figure 2:
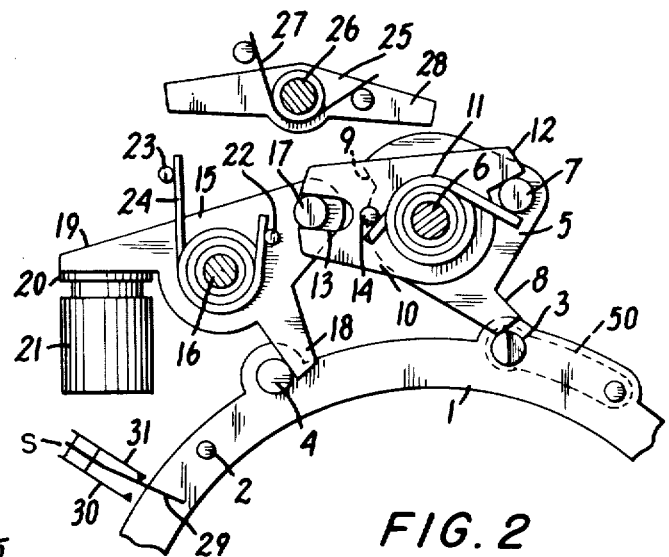
FIGS. 2 and 3 are elevation views of the shutter-operating mechanism illustrated in FIG. 1 and illustrate the mechanism in different operating modes for taking an exposure.
Figure 3:
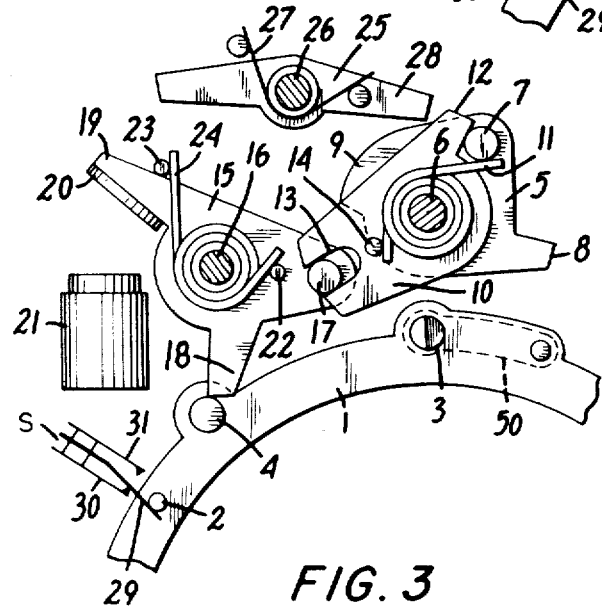
Figure 5:
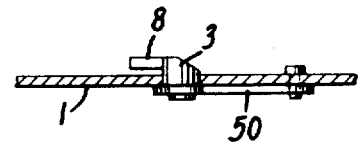
FIG. 5 is a fragmentary view of a part of the mechanism illustrated in FIG. 1.

With the shutter operating mechanism in a cocked condition as illustrated in FIG. 1 when the release button of the camera, not shown, is actuated the release lever 25 is rotated in a counterclockwise direction releasing the first driving member 5 so that its biasing spring 11 rotates it in a counterclockwise direction as illustrated in FIGS. 2 and 3. As the first driving member rotates its coupling pin 7 engages the coupling projection 12 of the second driving member after the shutter operating projection 8 there of has engaged the shutter- opening pin 3 and rotates the shutter ring clockwise in a shutter-opening direction. The engagement of the shutter-operating projection with the shutter-opening pin 3 is without substantial vibration since the pin 3 is resiliently mounted on or coupled to the shutter ring by a resilient spring member 50.

The coupling of the first and second driving members is likewise smoothly accomplished without impact vibration transmitted to the ring and to the remainder of the mechanism. The further rotation of the second and first driving member is delayed in view of the coupling connection 13, 17 to the third driving member 15, since it is being releasably held by the electromagnet 20, 21, in the event that the exposure time is such that the third driving member has not yet been released. The impact of the coupling between the first and second driving members does not vibrate the third driving member connection to the electromagnet. This provides for a stable coupling between the electromagnet and the third driving member and the electromagnet can be made of lesser attractive capacity.

When the shutter is in a cocked condition the change-over switch short circuits the capacitor 34 and the electromagnet operating coil 21 is electrically energized releasably holding the third driving member as before described. As the shutter-ring rotates and the change-over switch S is released the movable contact 29 switches to the other stationary contact 31 so that the photoconductive member 33 allows charging of the capacitor 34. The photoconductive device 33 senses the light brightness in the field of exposure in order to properly automatically control the exposure time. The capacitor in series therewith is charged to a voltage value to trigger the trigger circuitry of the control circuit so that the second stage transistor is blocked and the electromagnet operating coil 21 is de-energized and the third driving member is released. The third driving member 15 is driven rotationally rapidly by the two biasing springs 11, 24 in view of the coupling connection and direction of rotation of the driving members so that the shutter-closing projection 18 engages the shutter-closing pin 4 and drives the shutter blade-operating ring 1 in a shutter-closing or counterclockwise direction positively and rapidly so that the exposure time is accurately determined. The shutter and the driving mechanism is restored to the cocked condition by mechanism, not shown.

The shutter-operating mechanism in accordance with the invention provides for high speed exposures in which the exposure time or delay time is very short. The first and second driving members 5, 10 are rotationally driven positively in the same direction by the biasing spring 11 of the first driving member and its force is coupled to the biasing force of the driving spring 24 for the third driving member 15 which is quickly released by the electromagnet, when the time delay is short; the shutter can be driven rapidly to a closed position so that high speed exposures with accurate time delay, if any, or time exposure are possible.

Those skilled in the art will recognize that the armature 20 and electromagnet 21 operate under extremely stable conditions in holding the third driving member and that the electromagnet 21 can be made of smaller capacity than heretofore possible thereby increasing its life. Moreover, since the driving energy is divided between two springs the impact which arises from the coupling of the first and second driving member under control of the first driving spring is reduced on releasing of the shutter and is greatly decreased because the driving spring strength can be decreased and the first and second driving members are rotated in a common direction. The driving force of both springs positively drives the third driving member into a shutter-closing position so that the force thereof is additive as though they were one spring. The coupling connection between the second driving member and the third driving member functions such that the driving members are driven as through they were all rotating in a common direction. Thus smooth and positive operation of the shutter is made possible by the shutter operating mechanism according to the invention.

What I claim and desire to secure by Letters Patent is:

1. A shutter operating mechanism comprising, a shutter blade-operating ring rotationally mounted for operating shutter blades of a shutter from a closed position to an open position and back to a closed position, a first pivotally mounted shutter-ring driving member, a second pivotally mounted shutter-ring driving member, a spring biasing the first driving member rotationally, in a direction for rotating the shutter blade-operating ring in a direction for opening the shutter blades for taking an exposure, means coupling the second driving member to the first driving member for rotation thereby subsequently to initiation of rotation of said first driving member by said spring, a pivotally mounted release member releasably holding said first driving member against the force of said spring and actuated selectively to release the first driving member for taking a photographic exposure, a third pivotally mounted shutter ring driving member rotationally driving the shutter blade-operating ring in a direction for closing the shutter blades, means on the second driving member and means on the third driving member coupling both second and third driving members for rotation jointly in opposite rotational directions for assistance from said second driving member in driving the third driving member rotationally, means biasing the third driving member rotationally in a direction for closing the shutter blades, means releasably holding the third driving member in a rest position in condition for taking of said photographic exposure and determining the exposure time, means on said ring engaged by said first driving member for driving said shutter blade-operating ring, and means on said ring engaged by said third driving member for rotating said ring in a shutter blade closing direction.

2. A shutter operating mechanism according to claim 1, in which said spring biasing said first driving member comprises one end portion bearing on said second driving member and another end portion coupled to said first driving member.

3. In combination, a camera shutter having a shutter blade-operating ring rotationally driven for operating shutter blades from a closed position to an open position and back to said closed position, a first and a second rotationally driven shutter-operating members driven in a common direction, first spring means selectively driving rotationally the first and second shutter-operating member sequentially and jointly during a part of the travel thereof, means on said ring engaged by the first driving member during rotation thereof for driving the ring in a shutter opening direction, means to selectively initiate driving of said shutter operating members to effect an exposure, a third rotationally driven shutter-operating member coupled to the second shutter-operating member for rotation therewith in a direction opposite to said common direction, means engaged by said third shutter-operating member for rotating said ring in a direction closing the shutter blades, second spring means biasing the third shutter-operating member in said opposite direction, means controlling the duration of the period during which said shutter is open comprising means releasably holding said third shutter-operating member from rotation releasing the third shutter operating member to determine exposure time in the taking of a photographic exposure, means on the first shutter-operating member, and means on the second shutter-operating member coupling the first shutter-operating member to the second shutter-operating member during part of the travel of said first shutter operating member, thereby coupling is effected smoothly under control of said first spring means and the first and second spring means coact in closing the shutter rapidly and positively.

* * * * *